(12) United States Patent
Castellano et al.

(10) Patent No.: US 12,135,668 B2
(45) Date of Patent: Nov. 5, 2024

(54) ASYNCHRONOUS CONTROLLER FOR PROCESSING UNIT

(71) Applicant: STMicroelectronics S.r.l., Agrate Brianza (IT)

(72) Inventors: Marco Castellano, Pavia (IT); Francesco Bruni, Mirandola (IT); Luca Gandolfi, Milan (IT); Marco Leo, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 21 days.

(21) Appl. No.: 18/056,012

(22) Filed: Nov. 16, 2022

(65) Prior Publication Data

US 2024/0160593 A1     May 16, 2024

(51) Int. Cl.
*G06F 3/00*     (2006.01)
*G06F 13/40*    (2006.01)

(52) U.S. Cl.
CPC ...... *G06F 13/4068* (2013.01); *G06F 2213/40* (2013.01)

(58) Field of Classification Search
CPC .......... G06F 13/4068; G06F 2213/40
See application file for complete search history.

(56) References Cited

U.S. PATENT DOCUMENTS

| 5,553,276 A * | 9/1996 | Dean | G06F 9/3871 |
| | | | 712/E9.063 |
| 6,079,001 A * | 6/2000 | Le | G06F 13/1694 |
| | | | 713/400 |
| 2002/0120883 A1 * | 8/2002 | Cook | G06F 9/3869 |
| | | | 712/E9.063 |
| 2004/0153769 A1 * | 8/2004 | Lee | G06F 9/3861 |
| | | | 712/E9.05 |
| 2007/0098020 A1 * | 5/2007 | Ja | G06F 13/4291 |
| | | | 370/503 |
| 2009/0064065 A1 * | 3/2009 | Ikeda | G06F 30/398 |
| | | | 716/106 |
| 2016/0087618 A1 * | 3/2016 | Niitsuma | G06F 1/06 |
| | | | 365/233.11 |

(Continued)

OTHER PUBLICATIONS

Bhadra, Dipanjan et al., "Design of a Low Power, Relative Timing based Asynchronous MSP430 Microprocessor", IEEE Design, Automation & Test in Europe Conference & Exhibition, Mar. 27-31, 2017, 6 pages.

(Continued)

*Primary Examiner* — Henry Tsai
*Assistant Examiner* — Kim T Huynh
(74) *Attorney, Agent, or Firm* — Slater Matsil, LLP

(57) ABSTRACT

A processor includes a synchronous circuit including a plurality of processing stages, wherein each processing stage includes a selection data bus; and an asynchronous circuit coupled to each selection data bus, wherein the asynchronous circuit includes an asynchronous state machine whose states correspond to a process phase or a plurality of circuits, wherein the asynchronous circuit further includes a selectable delay circuit whose delay is determined by a present state of the asynchronous state machine, and wherein the asynchronous circuit is configured for generating a plurality of processing stage clock signals each having a selectable delay provided by the selectable delay circuit.

20 Claims, 14 Drawing Sheets

(56) References Cited

U.S. PATENT DOCUMENTS

2022/0197718 A1\* 6/2022 Drepper ............... G06F 9/3871

OTHER PUBLICATIONS

Chen, Chang-Jiu et al., "A Pipelined Asynchronous 8051 Soft-core Implemented with Balsa", APCCAS 2008—2008 IEEE Asia Pacific Conference on Circuits and Systems, Nov. 30-Dec. 2008, 4 pages.
Fiorentino, Mickael et al., "AnARM: A 28nm Energy Efficient ARM Processor Based on Octasic Asynchronous Technology", 25th IEEE International Symposium on Asynchronous Circuits and Systems (ASYNC), May 12-15, 2019; 2 pages.
Garside, J.D., et al., "The Amulet chips: Architectural Development for Asynchronous Microprocessors", 16th IEEE International Conference on Electronics, Circuits and Systems—(ICECS 2009), Dec. 13-16, 2009, 4 pages.

\* cited by examiner

ASYNCHRONOUS CONTROLLER FOR PROCESSING UNIT

TECHNICAL FIELD

The present invention relates generally to an asynchronous controller for a processing unit and, in particular embodiments, to a corresponding method.

BACKGROUND

Processors and processing units, such as microprocessors, are known in the art. A microprocessor comprises a computer processor where the data processing logic and control is typically fabricated on a single integrated circuit, or embedded in another integrated circuit. The microprocessor contains the arithmetic, logic, and control circuitry required to perform the functions of the computer's central processing unit. The integrated circuit is capable of interpreting and executing program instructions and performing arithmetic operations. The microprocessor is a multipurpose, clock-driven, register-based, digital integrated circuit that accepts binary data as input, processes it according to instructions stored in its memory, and provides results as output. Microprocessors contain both combinatorial logic and sequential digital logic, and operate on numbers and symbols represented in the binary number system.

In a typical microprocessor, a system clock is used for synchronizing the arithmetic, logic, and control circuitry. This synchronous clock is typically provided by a system oscillator. However, an oscillator is not always readily available, for example, on processing implementations of certain algorithms or processing implementations of Digital Signal Processing (DSP) on an Application Specific Integrated Circuit (ASIC). While some asynchronous digital controllers for self-timed (clockless) processors are known, drawbacks of these solutions can include increased power consumption and increased integrated circuit die area, and the use of additional trimming during fabrication, which can also increase costs.

SUMMARY

In an embodiment, a processor includes a synchronous circuit including a plurality of processing stages, wherein each processing stage includes a selection data bus; and an asynchronous circuit coupled to each selection data bus, wherein the asynchronous circuit includes an asynchronous state machine whose states correspond to a process phase or a plurality of circuits, wherein the asynchronous circuit further includes a selectable delay circuit whose delay is determined by a present state of the asynchronous state machine, and wherein the asynchronous circuit is configured for generating a plurality of processing stage clock signals each having a selectable delay provided by the selectable delay circuit.

In an embodiment, a method of operating a processor including a synchronous circuit including a plurality of processing stages and an asynchronous circuit including a plurality of clock circuits includes generating selection data in the plurality of processing stages, which is received by the plurality of clock circuits; and generating a plurality of clock signals in the plurality of clock circuits, which is received by the plurality of processing stages, and wherein each of the plurality of clock signals include a delay determined by a present state of the asynchronous circuit.

In another embodiment, a processor includes a synchronous circuit including an input data register, a delay and next state selection circuit coupled to the input data register, a clock logic circuit coupled to the delay and next state selection circuit, and an output data register coupled to the clock logic circuit, wherein the delay and next state selection circuit is configured for generating selection data on a selection data bus, and wherein the clock logic circuit is configured for receiving a plurality of clock signals; and an asynchronous circuit coupled to the selection data bus, wherein the asynchronous circuit is configured for receiving the selection data and in response generating the plurality of clock signals, and wherein each of the clock signals correspond to propagation delays of the delay and next state selection circuit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
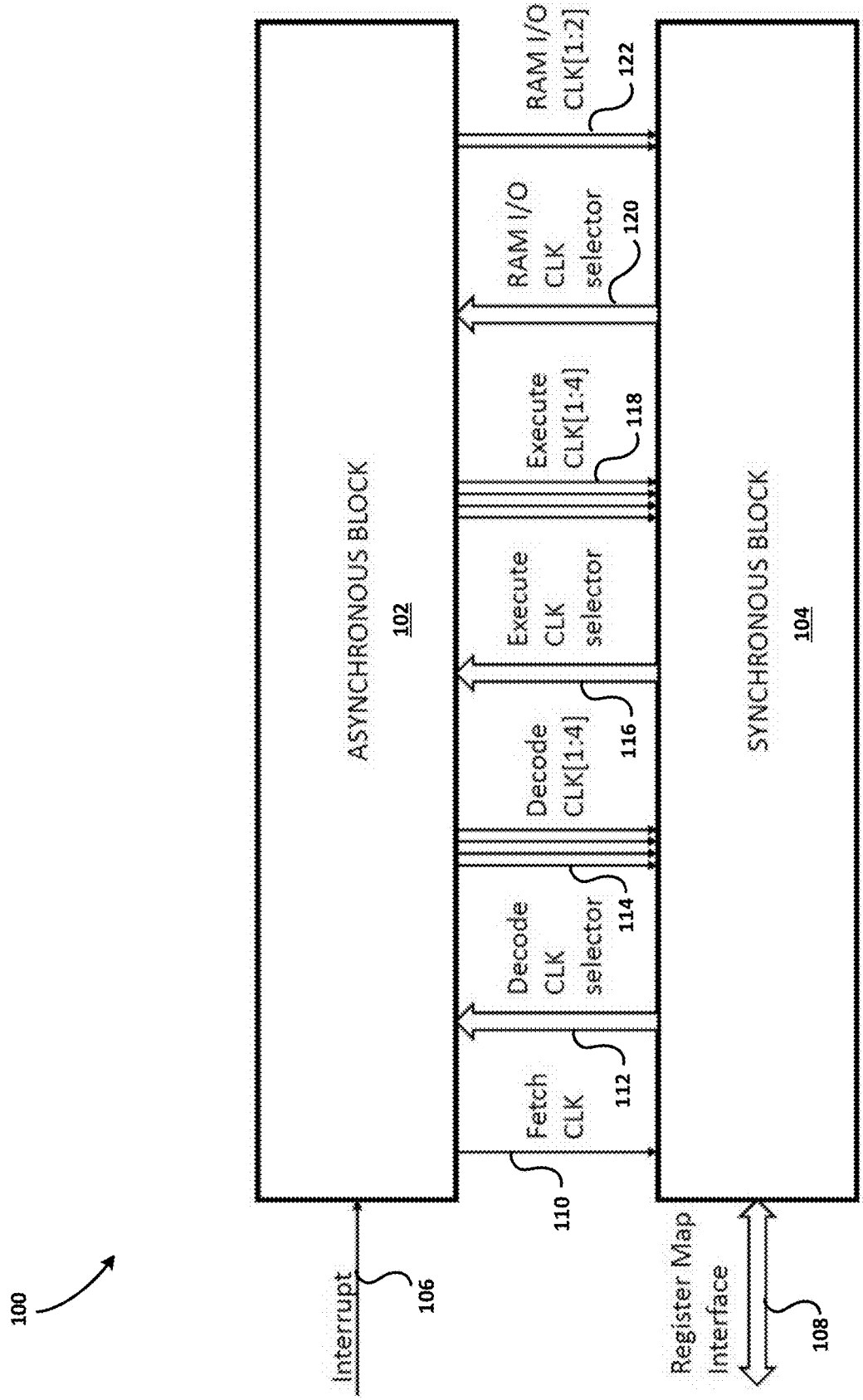
FIG. 1 is a top level diagram of a processing system having a synchronous block and an asynchronous block according to an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In the following detailed description, reference is made to the accompanying drawings, which form a part hereof and in which are shown by way of illustrations specific embodiments in which the invention may be practiced. It is to be understood that other embodiments may be utilized and structural or logical changes may be made without departing from the scope of the present invention. For example, features illustrated or described for one embodiment can be used on or in conjunction with other embodiments to yield yet a further embodiment. It is intended that the present invention includes such modifications and variations. The examples are described using specific language, which should not be construed as limiting the scope of the appending claims. The drawings are not scaled and are for illustrative purposes only. For clarity, the same or similar elements have been designated by corresponding references in the different drawings if not stated otherwise.

According to an embodiment, a processing system includes a synchronous processing block that is clocked by an asynchronous block, such as an asynchronous Finite State Machine (AFSM), that is used to generate local clocks used by different processing stages of the synchronous block. In an embodiment, the synchronous block can comprise a RISC processor or a picoProcessor (an 8-bit microprocessor intended for small embedded applications), but any standalone or embedded processor comprising a plurality of processing stages can be used. The clock pulses of the local clocks are generated with (matched) delays to tailor the duration of the clock periods to the latency of each corresponding specific instruction in the synchronous block. The sequence of activation of the processing stages may also be data-dependent, due to the operation of the AFSM in the asynchronous block. Data generated by the synchronous block, therefore, determines the clock sequence of the asynchronous block. In this way, the timing performance of the processing system is advantageously improved when compared to asynchronous solutions that use a worst-case estimate of the slowest combinatorial path of a synchronous processing block. The use of local clock trees can also lead to a reduction of the peak and average power consumption of the processing system when compared to a synchronous implementation using a system clock.

Embodiments of the present invention are also advantageous in the sense that an efficient standard synchronous design flow using may be used to design the core processing components of a particular processing circuit, thereby limiting the use of custom designed asynchronous logic to asynchronous clock generation. This synchronous design flow may include using, for example, high level languages such as VHDL, logic synthesis, and auto-routing tools to generate the logic circuits of the synchronous block. In some embodiments, asynchronous clock generation may be adapted to accommodate preexisting synchronous processing blocks.

Many products, particularly analog products, do not include an embedded oscillator, yet may benefit from the inclusion of an embedded processor for processing algorithms. The embedded processor may allow testing of the product, adding value to the product, enable background monitoring, and adding embedded algorithms for extending the field of applications for the product. In an embodiment, a processor can be used to implement a Built-In Self-Test (BIST) procedure of the product, by performing a check of the absence of faults in the system at startup. This can result in a reduced reliance upon external test equipment. "Background monitoring" is similar to BIST, but it is a periodic run-time check and it is aimed at checking the correct functionality of the product. An example of an analog product that can benefit from embedding a processor is any integrated sensor.

According to embodiments, a processing system suitable for use in a product not having access to a synchronous system clock or local oscillator, comprises a split design having a synchronous block, which can also be referred to as a synchronous module and an asynchronous block, which can also be referred to as an asynchronous module. The synchronous module includes a plurality of processing components including, for example, an Arithmetic Logic Unit (ALU), Read-Only Memory (ROM), Random Access Memory (RAM), Instruction Decode Unit (IDU), as well as registers and other components in some embodiments. The components are divided into functional blocks, with each functional block being synchronous to a local clock signal. The asynchronous module uses an Asynchronous Finite State Machine (AFSM) to generate the local clocks for the various blocks of the processor. The asynchronous module uses matched delays (to instruction delays in the synchronous module) to optimize the period of the local clocks. The delays are thus matched by matching the timing of the local clocks to the delay needed by the elaborations performed in the synchronous module. In an embodiment, the asynchronous module is a full custom design circuit, whereas the synchronous module can be a standard product such as a RISC processor or a processor intended for embedded applications such as a picoProcessor. In other embodiments, other design partitioning of the asynchronous module and synchronous module can be used. In an embodiment a full custom design is a design that is not based on well-known digital design flows (for example using custom logic cells and connecting them according to an internally developed flow), and a standard product is a product whose design is implemented with standard logic cells (combinatorial logic and flip flops, sometimes referred to as "Standard Digital IP") using well-known design flows.

In an embodiment, the operation of the processing system is divided into a plurality states, corresponding to the following processing or "elaboration" stages: a FETCH_STATE, wherein a current instruction is fetched from code memory and loaded into the instruction register; a DECODE_STATE, wherein the instruction is decoded and any required operands are fetched from memory of from the register file; an EXECUTION_STATE, wherein the instruction is executed; a RAM_I/O_STATE, wherein the decode and fetch states read and write to the RAM memory; and a STOP_STATE, wherein the operation of the asynchronous module is temporarily halted. In an embodiment, an elaboration stage is the physical section of the processor implementing the function of one state. For example, for the "Fetch state" the section of the synchronous module that is activated and performs data elaboration when the processor is in the "Fetch state" is the corresponding elaboration stage. In an embodiment, data elaboration is data processing, i.e. the combinatorial function implemented by each of the elaboration stages.

The transition between the operational states is managed by custom logic in the asynchronous block that generates control signals. The elaboration stages in the synchronous block are physically mapped to the states of the asynchronous FSM. The sequence and timing of the states can vary during the execution, and be tailored to each different instruction in the synchronous block. The control signals are described in greater detail below.

Each state of the processor has the ability to: select a clock delay, tailored to match the INSTRUCTION being executed; the OPERANDS being elaborated; the NEXT STATE of elaboration; and update its own set of registers. This approach allows the creation of local clock trees, which are smaller than a global clock tree of a synchronous processor. This approach is very powerful compared to the known state of the art, as it allows non-linear execution flows as will be described in further detail below.

According to an embodiment, a processing system comprising an asynchronous module for generating local clock signals and a synchronous module for receiving the local clock signals is described below with respect to FIGS. 1-10. The delays of the local clock signals and instructions in the synchronous module are matched, so that robust performance with respect to variations in supply voltage, temperature, and fabrication process parameters of the processing system is advantageously achieved.

FIG. 1 is a top level block diagram of a processing system 100 showing a synchronous block 104 and an asynchronous block 102, according to an embodiment. The synchronous block 104 comprises a RISC processor, a picoProcessor, a general purpose processor, or sequential logic circuit, and communicates with and/or is part of an associated product (not shown in FIG. 1) through the register map interface bus 108. The asynchronous block 102 can comprise a custom circuit comprising a plurality of local clock circuits. Asynchronous block 102 receives an INTERRUPT signal 106 from the associated product (not shown in FIG. 1). The interrupt signal is generated any time a new elaboration run is requested by the product to the processor. For example, in a sensor application, the interrupt can be generated any time a new set of data from the sensor is available and must be elaborated by the processor. The interrupt signal is an input to the asynchronous STOP state and has the effect of "unfreezing" the processor by exiting the STOP state itself, in an embodiment. The asynchronous block 102 generates a plurality of local clock signals (processing stage clock signals) including a FETCH clock signal 110, a plurality of DECODE clock signals 114, a plurality of EXECUTE clock signals 118, and a plurality of RAM I/O clock signals 122 that are received by corresponding processing stages in the synchronous block 104. The synchronous block 104 communicates with the asynchronous block 102 through a plurality of busses (selection data busses), including a DECODE clock selector bus 112 (DECODE selection data bus), an EXECUTE clock selector bus 116 (EXECUTE selection data bus), and a RAM I/O clock selector bus 120, that are received by corresponding sections of the asynchronous block 102.

Figure 6:
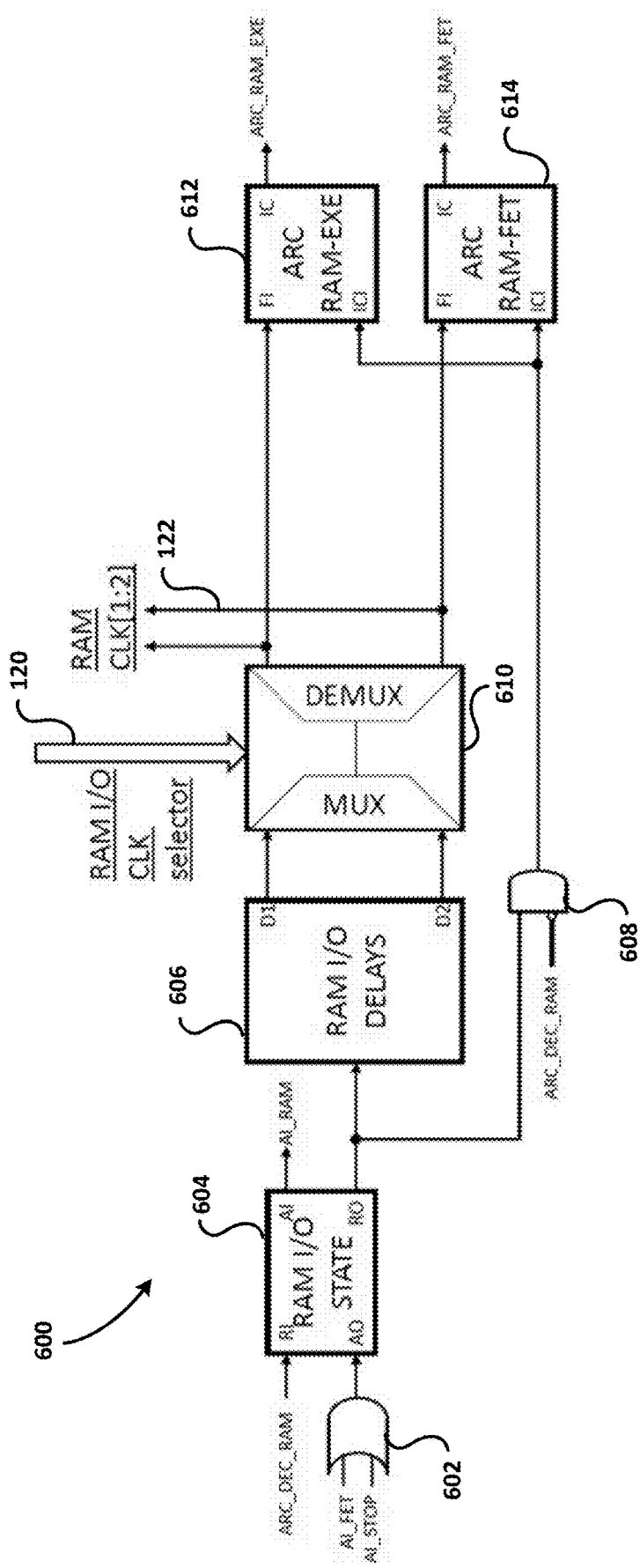
FIG. 6 is a schematic diagram of an input/output (I/O) section of the asynchronous block shown in FIG. 2.
Figure 7:
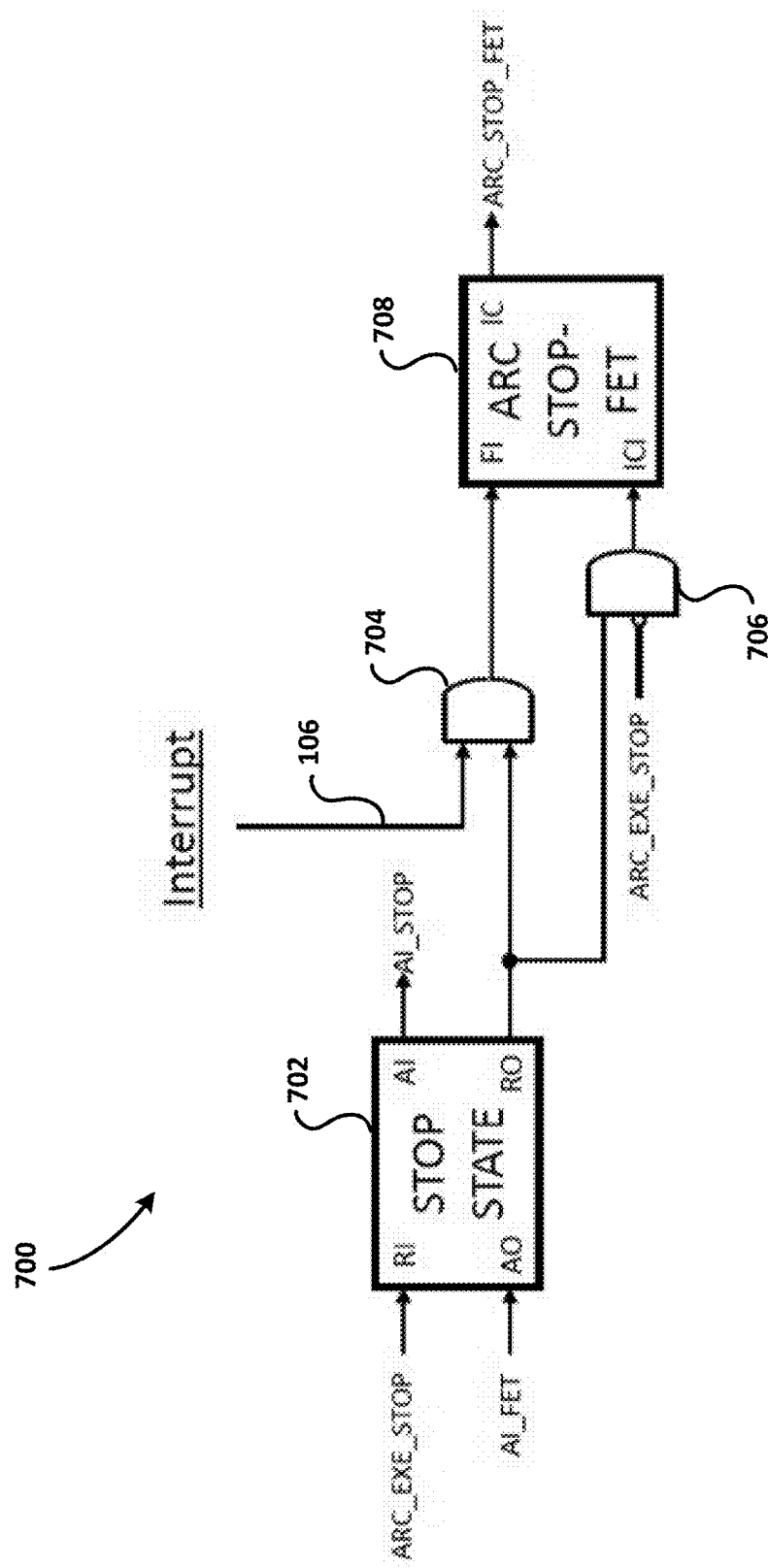
FIG. 7 is a schematic diagram of a stop section of the asynchronous block shown in FIG. 2.
Figure 8:
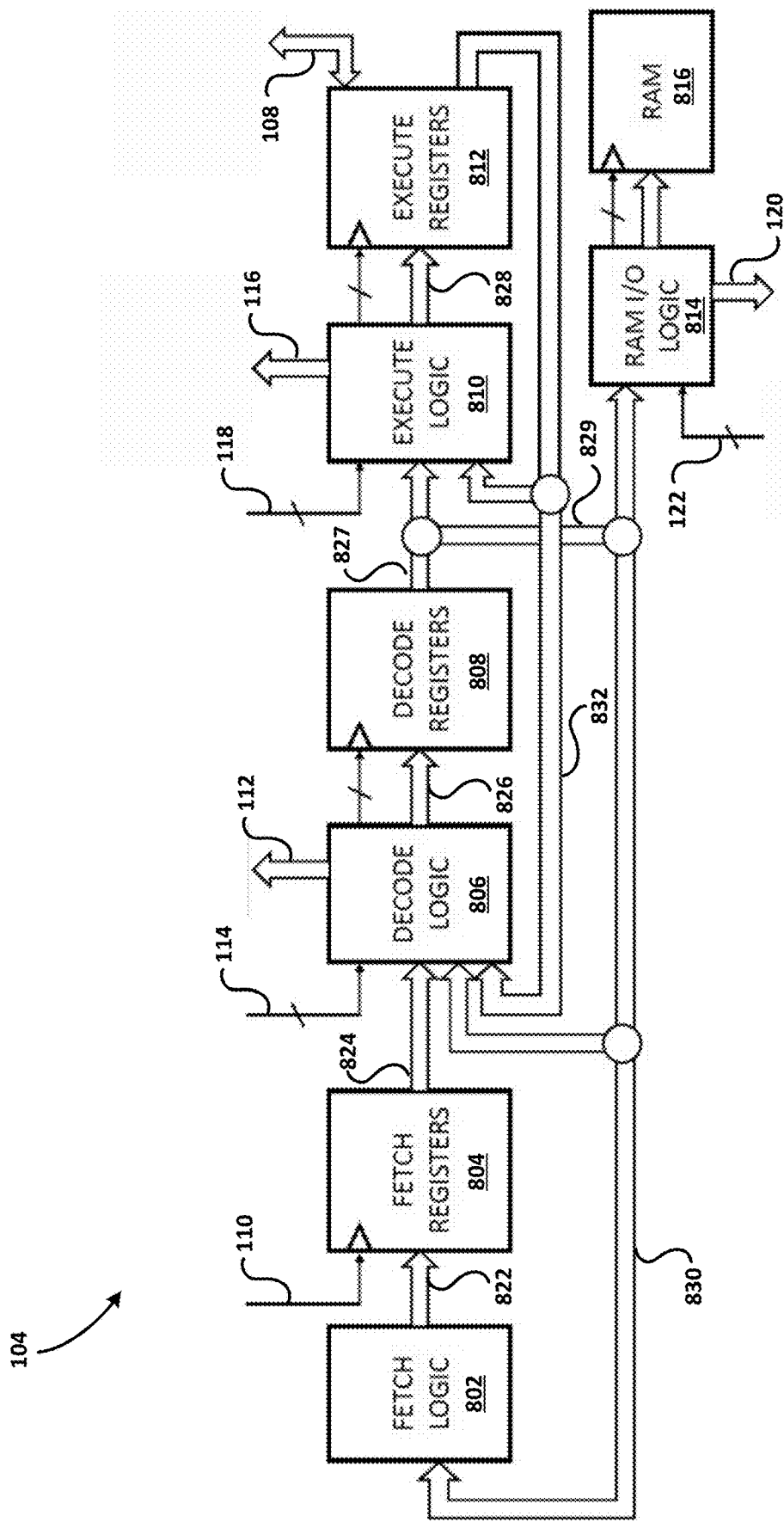
FIG. 8 is a top level block diagram of the synchronous block shown in FIG. 1.
Figure 9:
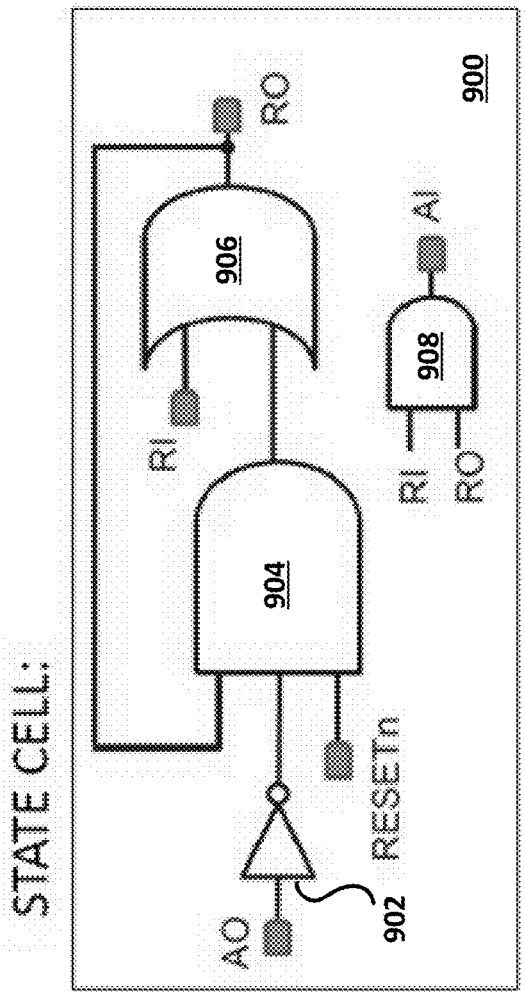
FIG. 9 is a schematic diagram of a state cell as shown in FIGS. 3-7.
Figure 10:
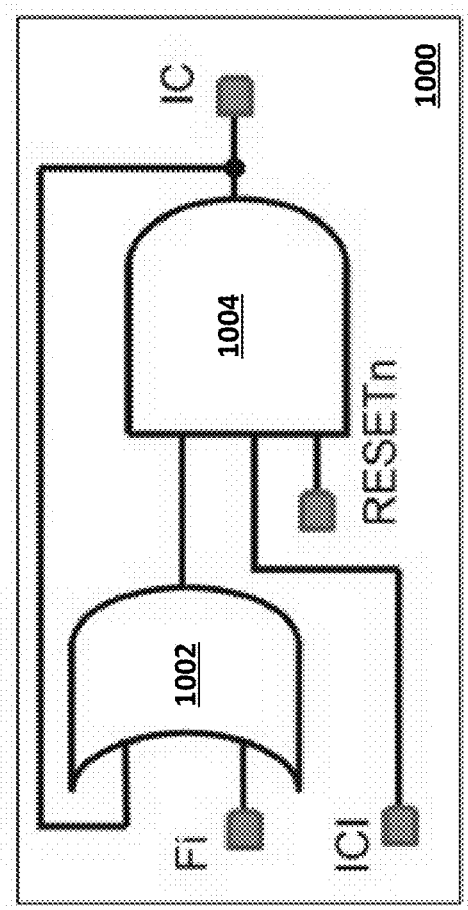
FIG. 10 is a schematic diagram of an arc cell as shown in FIGS. 3-7.

FIGS. 2-10 are block level diagrams and schematic diagrams that provide further detail of the structure and operation of the asynchronous block 102 and the synchronous block 104, and, in particular, provide further detail on the interaction between clock and data signals that are exchanged by the asynchronous block 102 and the synchronous block 104. FIGS. 2-7 are associated with the asynchronous block 102 and thus provide further detail on generating the clock signals and receiving the data signals. FIG. 8 is associated with the synchronous block 104 and thus provides further details on generating the data signals and receiving the clock signals. FIGS. 9 and 10 are also associated with the asynchronous block 102 and provide further schematic details of sub-blocks or subcomponents blocks shown in FIGS. 2-7.

Figure 2:
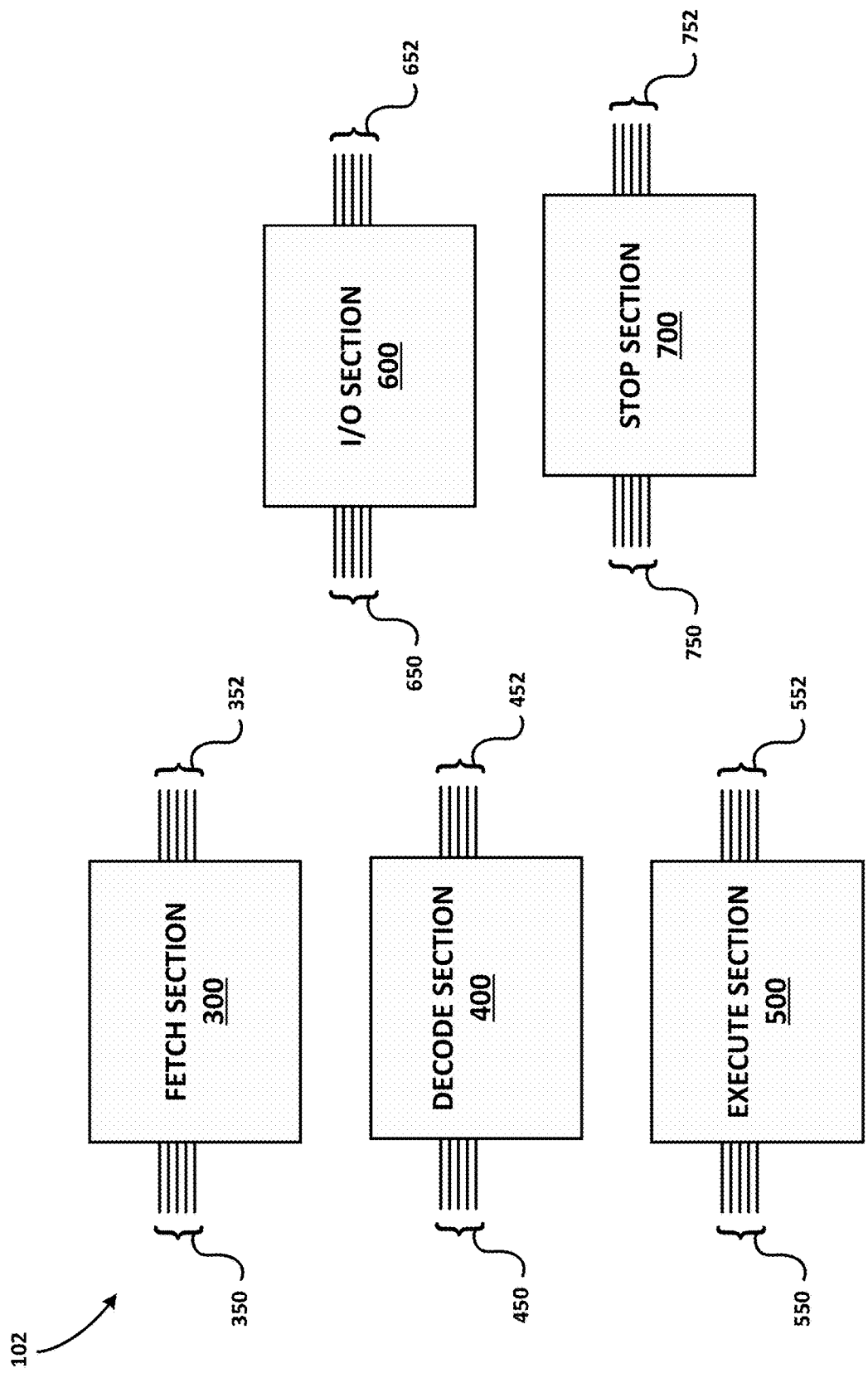
FIG. 2 is a top level diagram of the asynchronous block shown in FIG. 1.

FIG. 2 is a top-level block diagram of the asynchronous block 102 shown in FIG. 1, comprising a plurality of sections corresponding to finite state machine states. For sake of clarity the local clock signal outputs and clock selection input busses are not shown. However, each section comprises a plurality of arc and acknowledgement inputs and outputs that are interconnected with the arc and acknowledgement inputs and outputs of other sections. (The interconnection is not shown in FIG. 2, but is described in further detail below.) These inputs and outputs are internal to the asynchronous block 102, in an embodiment.

FIG. 2 thus shows a FETCH section 300 including a plurality of arc and acknowledgement inputs 350 and a plurality of arc and acknowledgement outputs 352; a DECODE section 400 including a plurality of arc and acknowledgement inputs 450 and a plurality of arc and acknowledgement outputs 452; an EXECUTE section 500 including a plurality of arc and acknowledgement inputs 550 and a plurality of arc and acknowledgement outputs 552; a RAM I/O section 600 including a plurality of arc and acknowledgement inputs 650 and a plurality of arc and acknowledgement outputs 652; and a STOP section 700 (STOP circuit) including a plurality of arc and acknowledgement inputs 750 and a plurality of arc and acknowledgement outputs 752.

Figure 3:
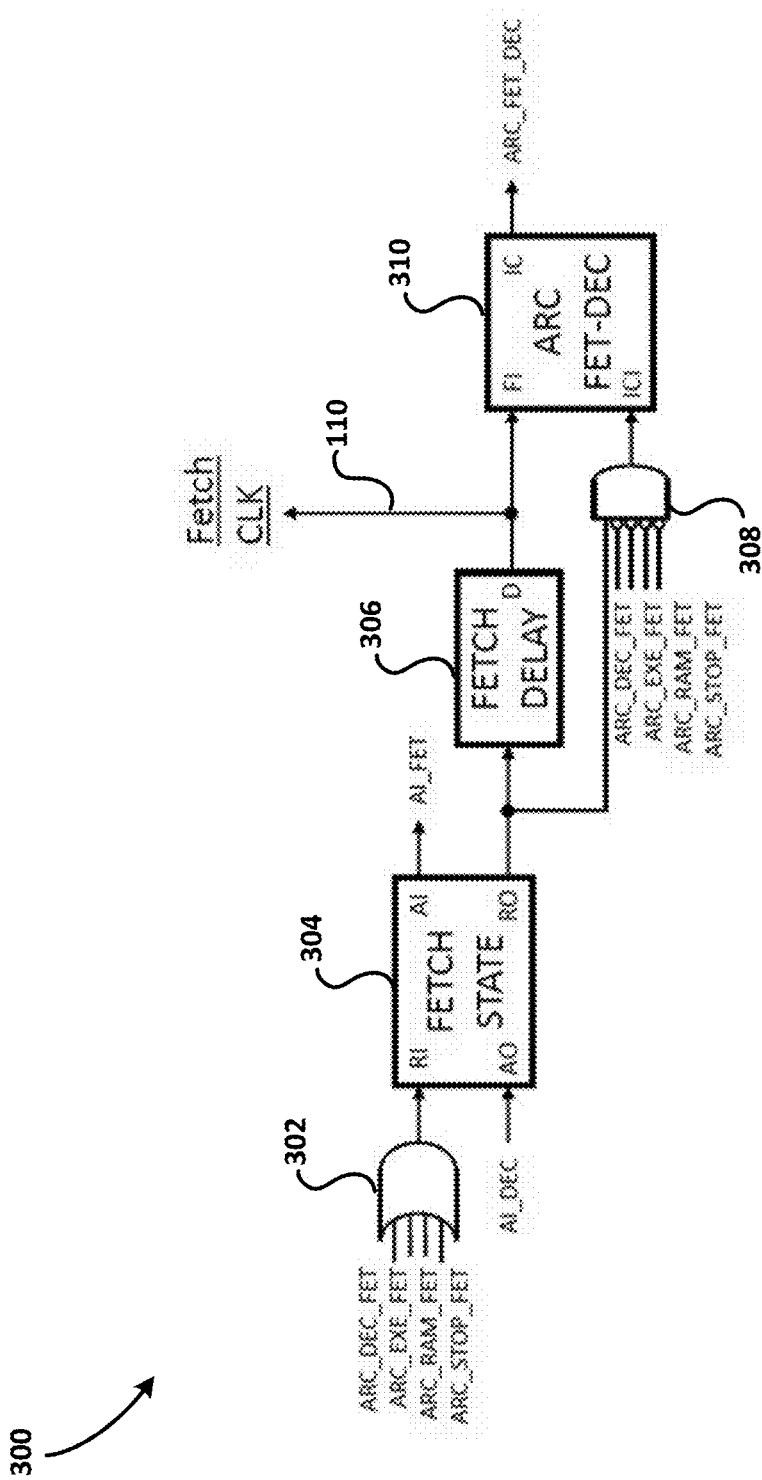
FIG. 3 is a schematic diagram of a fetch section of the asynchronous block shown in FIG. 2.

FIG. 3 is a schematic diagram of a FETCH section 300 of the asynchronous block 102 shown in FIG. 2. In an embodiment, FETCH section 300 comprises a FETCH clock circuit for generating a FETCH clock signal. FETCH section 300 includes an input OR gate 302 for receiving a plurality of ARC signals from other sections, including an ARC_DEC_FET, an ARC_EXE_FET, an ARC_RAM_FET, and an ARC_STOP_FET signal. A FETCH state circuit 304 has an RI input coupled to the output of OR gate 302, an AO input for receiving an AI_DEC acknowledgement signal from another section, an AI output for generating an AI_FET acknowledgement signal, and an RO output. A FETCH delay circuit 306 has an input coupled to the RO output of the FETCH state circuit 304 and generates the FETCH clock signal no, which is a delayed version of the signal at the input of the FETCH delay circuit 306. The delay of FETCH delay circuit 306 is determined by matching of a propagation delay of the current state. The delay cells in the asynchronous module match the propagation delay of the corresponding combinatorial logic in the synchronous module. For example, the delay of FETCH delay circuit 306 matches the propagation delay of the FETCH logic 802 (best seen in FIG. 8). FETCH section 300 also includes an AND gate 308 having an input coupled to the RO output of FETCH state circuit 304, and a plurality of inverted inputs for receiving the ARC_DEC_FET, ARC_EXE_FET, ARC_RAM_FET, and ARC_STOP_FET arc signals. An ARC circuit 310 (designated ARC FET-DEC) has an FI input for receiving the FETCH clock signal 110, an ICI input coupled to the output of AND gate 308, and an IC output for generating the ARC_FET_DEC arc signal.

Figure 4:
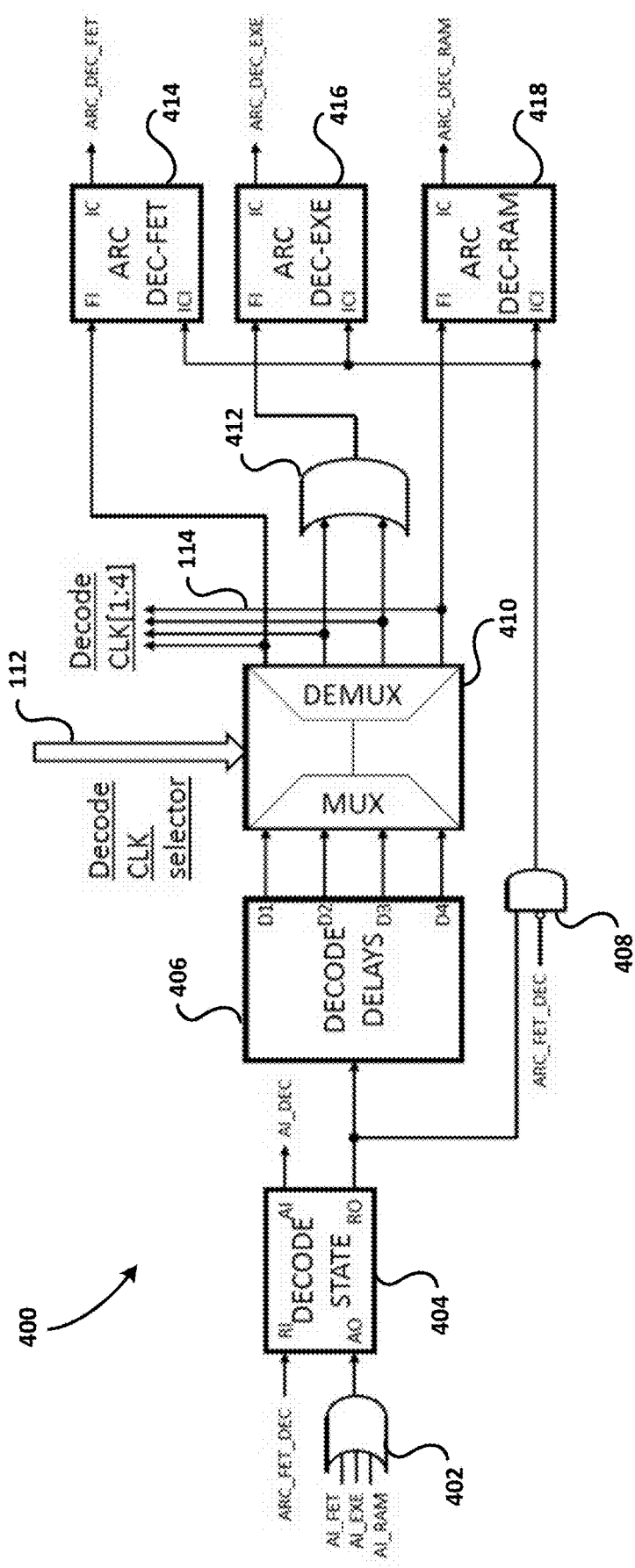
FIG. 4 is a schematic diagram of a decode section of the asynchronous block shown in FIG. 2.

FIG. 4 is a schematic diagram of a DECODE section 400 of the asynchronous block 102 shown in FIG. 2. In an embodiment, DECODE section 400 comprises a DECODE clock circuit for generating a plurality of DECODE clock signals. DECODE section 40o includes an input OR gate 402 for receiving a plurality of AI acknowledgement signals from other sections, including an AI_FET, an AI_EXE, and an AI_RAM signal. A DECODE state circuit 404 has an AO input coupled to the output of OR gate 402, an RI input for receiving an ARC_FET_DEC arc signal from another section, an AI output for generating an AI_DEC acknowledgement signal, and an RO output. A DECODE delay circuit 406 has an input coupled to the RO output of the DECODE state circuit 404 and generates a plurality of clock signals at the D1, D2, D3, and D4 outputs, which are delayed versions of the signal at the input of the DECODE delay circuit 406. The delays of DECODE delay circuit 406 are each determined by matching of a propagation delay of the current state. DECODE section 400 includes a multiplexer/demultiplexer (MUX/DEMUX) circuit 410 having a plurality of inputs coupled to the D1, D2, D3, and D4 outputs of the DECODE delay circuit 406, and a plurality of outputs for generating the DECODE clock signals 114. MUX/DEMUX circuit 410 is under control of and coupled to the DECODE clock selector bus 112. DECODE section 400 also includes an AND gate 408 having an input coupled to the RO output of DECODE state circuit 404, and an input for receiving the ARC_DEC_FET arc signal. DECODE section 400 also includes an OR gate 412 having two inputs coupled to two of the DECODE clock signals 114. A first ARC circuit 414 (designated ARC FET-DEC) has an FI input for receiving one of the DECODE clock signals 114, an ICI input coupled to the output of AND gate 408, and an IC output for generating the ARC_FET_DEC arc signal. A second ARC circuit 416 (designated ARC DEC-EXE) has an FI input coupled to the output of OR gate 412, an ICI input coupled to the output of AND gate 408, and an IC output for generating the ARC_DEC_EXE arc signal. A third ARC circuit 418 (designated ARC DEC-RAM) has an FI input for receiving one of the DECODE clock signals 114, an ICI input coupled to the output of AND gate 408, and an IC output for generating the ARC_DEC_RAM arc signal.

Figure 5:
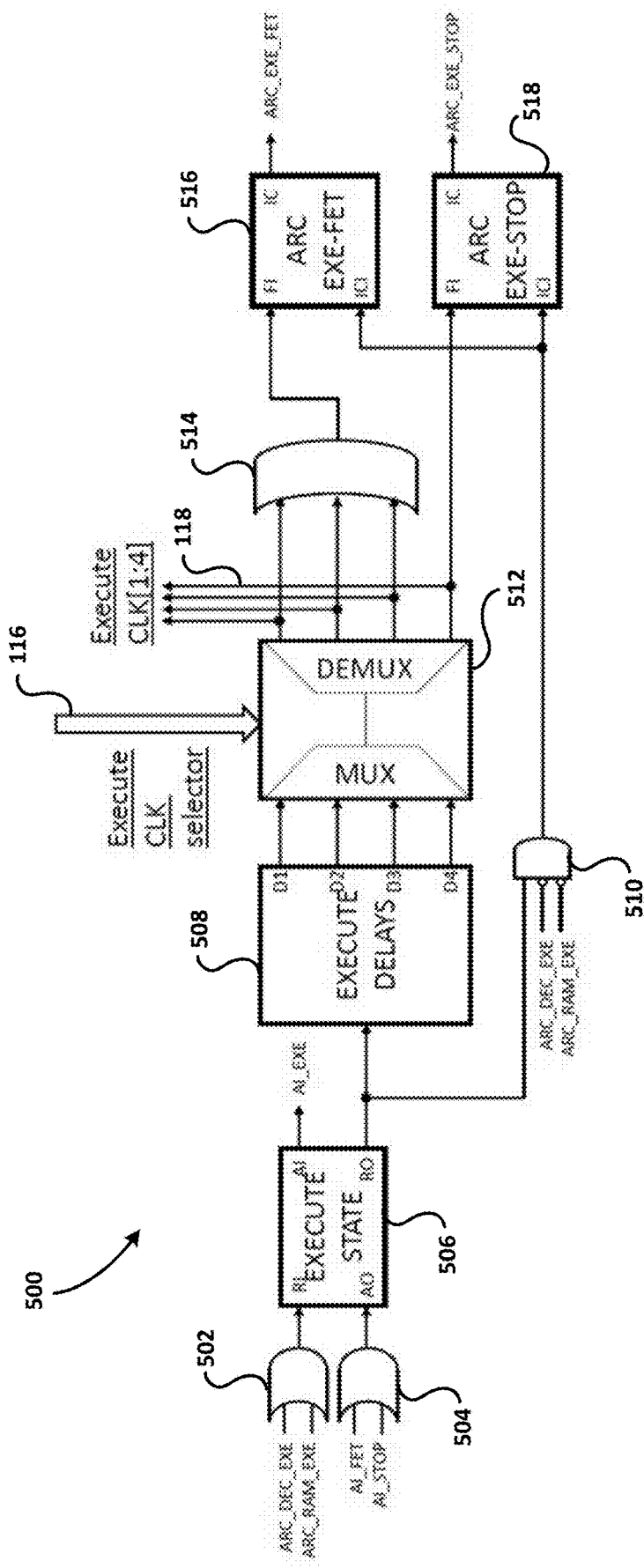
FIG. 5 is a schematic diagram of an execute section of the asynchronous block shown in FIG. 2.

FIG. 5 is a schematic diagram of an EXECUTE section 500 of the asynchronous block 102 shown in FIG. 2. In an embodiment, EXECUTE section 500 comprises an EXECUTE clock circuit for generating a plurality of EXECUTE clock signals. EXECUTE section 500 includes a first input OR gate 502 for receiving a plurality of arc signals from other sections, including an ARC_DEC_EXE signal and an ARC_RAM_EXE signal, and a second input OR gate 504 for receiving a plurality of AI acknowledgement signals from other sections, including an AI_FET, an AI_EXE, and an AI_STOP signal. An EXECUTE state circuit 506 has an AO input coupled to the output of OR gate 504, an RI input coupled to the output of OR gate 502, an AI output for generating an AI_EXE acknowledgement signal, and an RO output. An EXECUTE delay circuit 508 has an input coupled to the RO output of the EXECUTE state circuit 506 and generates a plurality of clock signals at the D1, D2, D3, and D4 outputs, which are delayed versions of the signal at the input of the EXECUTE delay circuit 508. The delays of EXECUTE delay circuit 508 are each determined by matching of a propagation delay of the current state. EXECUTE section 500 includes a multiplexer/demultiplexer (MUX/ DEMUX) circuit 512 having a plurality of inputs coupled to the D1, D2, D3, and D4 outputs of the EXECUTE delay circuit 508, and a plurality of outputs for generating the EXECUTE clock signals 118. MUX/DEMUX circuit 512 is under control of and coupled to the EXECUTE clock selector bus 116. EXECUTE section 500 also includes an AND gate 510 having an input coupled to the RO output of EXECUTE state circuit 506, an inverting input for receiving the ARC_DEC_EXE arc signal, and an inverting input for receiving the ARC_RAM_EXE arc signal. EXECUTE section 500 also includes an OR gate 514 having three inputs coupled to three of the EXECUTE clock signals 118. A first ARC circuit 516 (designated ARC EXE-FET) has an FI input coupled to the output of OR gate 514, an ICI input coupled to the output of AND gate 510, and an IC output for generating the ARC_EXE_FET arc signal. A second ARC circuit 518 (designated ARC EXE-STOP) has an FI input for receiving one of the EXECUTE clock signals 118, an ICI input coupled to the output of AND gate 510, and an IC output for generating the ARC EXE STOP arc signal.

FIG. 6 is a schematic diagram of a RAM I/O section 600 of the asynchronous block 102 shown in FIG. 2. RAM I/O section 600 includes an OR gate 502 for receiving a plurality of acknowledgement signals from other sections, including an AI_FET signal and an AI_STOP signal. A RAM I/O state circuit 604 has an AO input coupled to the output of OR gate 602, an RI input for receiving an arc signal ARC_DEC_RAM, an AI output for generating an AI_RAM acknowledgement signal, and an RO output. A RAM I/O delay circuit 606 has an input coupled to the RO output of the RAM I/O state circuit 604 and generates a plurality of clock signals at the D1 and D2 outputs, which are delayed versions of the signal at the input of the RAM I/O delay circuit 606. The delays of RAM I/O delay circuit 606 are each determined by matching of a propagation delay of the current state. RAM I/O section 60o includes a multiplexer/demultiplexer (MUX/DEMUX) circuit 610 having a plurality of inputs coupled to the D1 and D2 outputs of the RAM I/O delay circuit 606, and a plurality of outputs for generating the RAM I/O clock signals 122. MUX/DEMUX circuit 610 is under control of and coupled to the RAM I/O clock selector bus 120. RAM I/O section 60o also includes an AND gate 608 having an input coupled to the RO output of RAM I/O state circuit 604, and an inverting input for receiving the ARC_DEC_RAM arc signal. A first ARC circuit 516 (designated ARC RAM-EXE) has an FI input coupled to an output of MUX/DEMUX circuit 610, an ICI input coupled to the output of AND gate 608, and an IC output for generating the ARC_RAM_EXE arc signal. A second ARC circuit 614 (designated ARC RAM-FET) has an FI input coupled to another output of MUX/DEMUX circuit 610, an ICI input coupled to the output of AND gate 608, and an IC output for generating the ARC_RAM_FET arc signal.

FIG. 7 is a schematic diagram of a STOP section 700 of the asynchronous block 102 shown in FIG. 2. RAM I/O section 60o includes a STOP state circuit 702 having an AO input for receiving the AI_FET acknowledgement signal, an RI input for receiving an arc signal ARC_EXE_STOP, an AI output for generating an AI_STOP acknowledgement signal, and an RO output. STOP section 700 also includes a first AND gate 704 having an input coupled to the RO output of STOP state circuit 702, and an input for receiving the INTERRUPT signal 106, and a second AND gate 706 having an input coupled to the RO output of STOP state circuit 702, and an inverting input for receiving arc signal ARC_EXE_STOP. An ARC circuit 708 (designated ARC STOP-FET) has an FI input coupled to the output of the first AND gate 704, an ICI input coupled to the output of the second AND gate 706, and an IC output for generating the ARC_STOP_FET arc signal.

FIG. 8 is a top level block diagram of the synchronous block 104 shown in FIG. 1. FIG. 8 shows each of the processing stages and, in particular, the sub-blocks for receiving the local clock signals and for generating the clock selection digital busses. The FETCH processing stage includes a FETCH logic 802 coupled to a plurality of FETCH registers 804 through bus 822. An input of the FETCH registers 804 receives the FETCH clock signal 110.

The FETCH processing stage is coupled to the DECODE processing stage through bus 824. The DECODE processing stage includes a DECODE logic block 806 coupled to a plurality of DECODE registers 808 through bus 826. An input of the DECODE logic block 806 receives the DECODE clock signal 114 and generates the data for the DECODE clock selection digital bus 112.

The DECODE processing stage is coupled to the EXECUTE processing stage through bus 827. The EXECUTE processing stage includes an EXECUTE logic block 810 coupled to a plurality of EXECUTE registers 812 through bus 828. An input of the EXECUTE logic block 810 receives the EXECUTE clock signal 118 and generates the data for the EXECUTE clock selection digital bus 116. The EXECUTE registers 812 are coupled to the register map interface bus 108. The DECODE and EXECUTE processing stages are coupled through bus 832.

The RAM I/O processing stage is coupled to the FETCH, DECODE, and EXECUTE processing stages through busses 829 and 830. The RAM I/O processing stage includes a RAM I/O logic block 814 coupled to RAM memory 816. An input of the RAM I/O logic block 814 receives the RAM I/O clock signal 122 and generates the data for the RAM I/O clock selection digital bus 120.

The subcomponents of the asynchronous block 102 are now described with respect to FIG. 9 and FIG. 10, including the state cells, the arc cells, the MUX/DEMUX circuits, and the delay cells.

FIG. 9 is a schematic of a STATE CELL 900 suitable for use in any of the state circuits previously shown or described in any of the asynchronous block 102 sections (e.g., FETCH state circuit 304 shown in FIG. 3, DECODE state circuit 404 shown in FIG. 4, EXECUTE state circuit 506 shown in FIG. 5, RAM I/O state circuit 604 shown in FIG. 6, and STOP state circuit shown in FIG. 7.)

STATE CELL 900 comprises an inverter 902 having an input coupled to the AO input, and a first AND gate 904 having a first input coupled to the RO output, a second input coupled to the output of inverter 902, and a third input coupled to a RESETn input. STATE CELL 900 further comprises an OR gate 906 having a first input coupled to the RI input, a second input coupled to the output of the first AND gate 904, and an output coupled to the RO output, and a second AND gate 908 having a first input coupled to the RI input, a second input coupled to the RO input, and an output coupled to the AI output.

In operation, STATE CELL 90o performs a logic function of the AO, RI, and RESETn inputs to provide the RO output. In addition, STATE CELL 90o performs a logic function of the RI and RO inputs to the AI output. The logic functions for state cells and arc cells (described below) are designed to implement a handshake protocol needed for the correct functioning of the Asynchronous Finite State Machine (AFSM).

FIG. 10 is a schematic of an ARC CELL woo suitable for use in any of the arc circuits previously shown or described in any of the asynchronous block 102 section (e.g., ARC circuit 310 shown in FIG. 3, ARC circuits 414, 416, and 418 shown in FIG. 4, ARC circuits 516 and 518 shown in FIG. 5, ARC circuits 612 and 614 shown in FIG. 6, and ARC circuit 708 shown in FIG. 7.)

ARC CELL woo comprises an OR gate 1002 having a first input coupled to the IC output and a second input coupled to the FI input, and an AND gate 1004 having a first input coupled to the output of the OR gate 1002, a second input coupled to the ICI input, a third input coupled to the RESETn input, and an output coupled to the IC output.

In operation, ARC CELL woo performs a logic function of the FI, ICI, and RESETn inputs to provide the IC output.

The MUX/DEMUX circuits previously shown and described can be implemented as the series combination of a multiplexer circuit and a demultiplexer circuit. Any suitable multiplexer or demultiplexer circuits can be used. The DELAY circuits previously shown and described can be implemented using serially-coupled logic buffers as delay elements. Any suitable logic buffers can be used. Other delay elements can also be used.

In contrast to the asynchronous block 102, the synchronous block 104 may not need any custom circuits in an embodiment. For example, in an embodiment, the FETCH, DECODE, EXECUTE, and RAM I/O processing stages can be implemented with standard digital logic for providing combinatorial and sequential logic functions using a standard hardware description language (VHDL, Verilog).

The method of the present invention is described in further detail below with respect to a processing system including a specific synchronous block implementation. The processing system described below can be used in conjunction with a product, such as an analog circuit product, or in conjunction with other digital and analog systems that do not ordinarily include an oscillator for the generation of a synchronous clock signal.

As previously described, embodiment processing systems comprise an architecture including an asynchronous microprocessor for the implementation of digital algorithms when an oscillator is not available. The embodiment processing systems advantageously exploit the absence of a unique clock signal for the improvement of a digital system in terms of power consumption, flexibility and speed of operation. In an embodiment, a simple processor, which can be referred to as a picoProcessor, is used in conjunction with the asynchronous architecture because of the type of computations typically demanded by certain product applications, such as sensor applications. However, the asynchronous architecture described below can be applied in general to different processors or DSPs as shown and described above.

Figure 11:
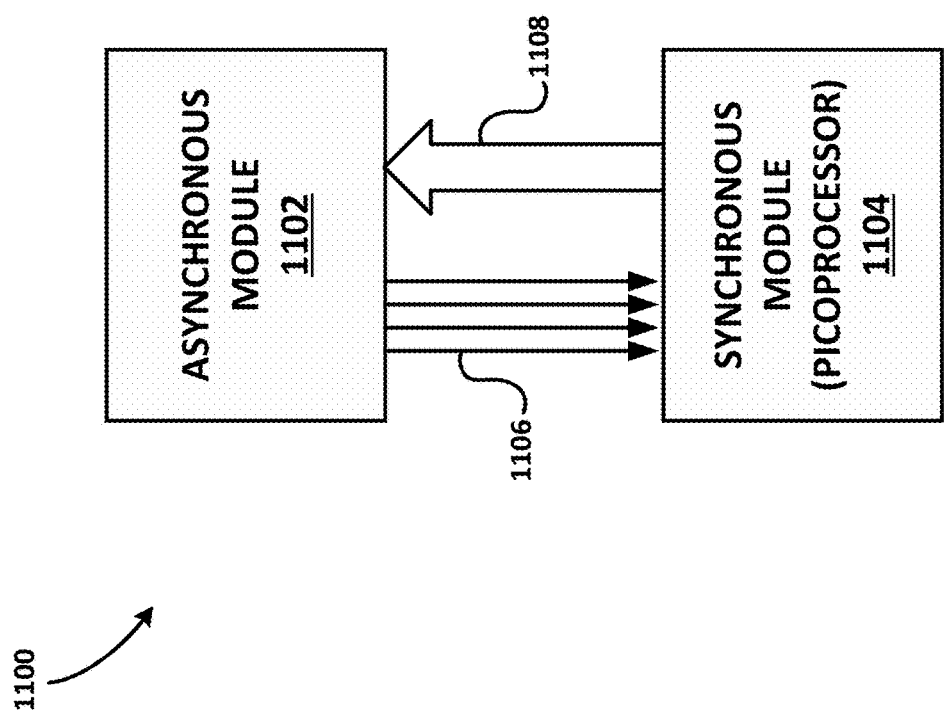
FIG. 11 is a high level block diagram of a processing system according to the present invention having an asynchronous module and a synchronous module according to another embodiment of the invention.

FIG. 11 is a block diagram of a processing system 1100 according to an embodiment, comprising a synchronous module 1104 (picoProcessor) and an asynchronous module 1102 for receiving clock selection data from the synchronous module 1104 through bus 1108 and for generating local clock signals 1106 that are in turn received by the synchronous module 1104.

Figure 12:
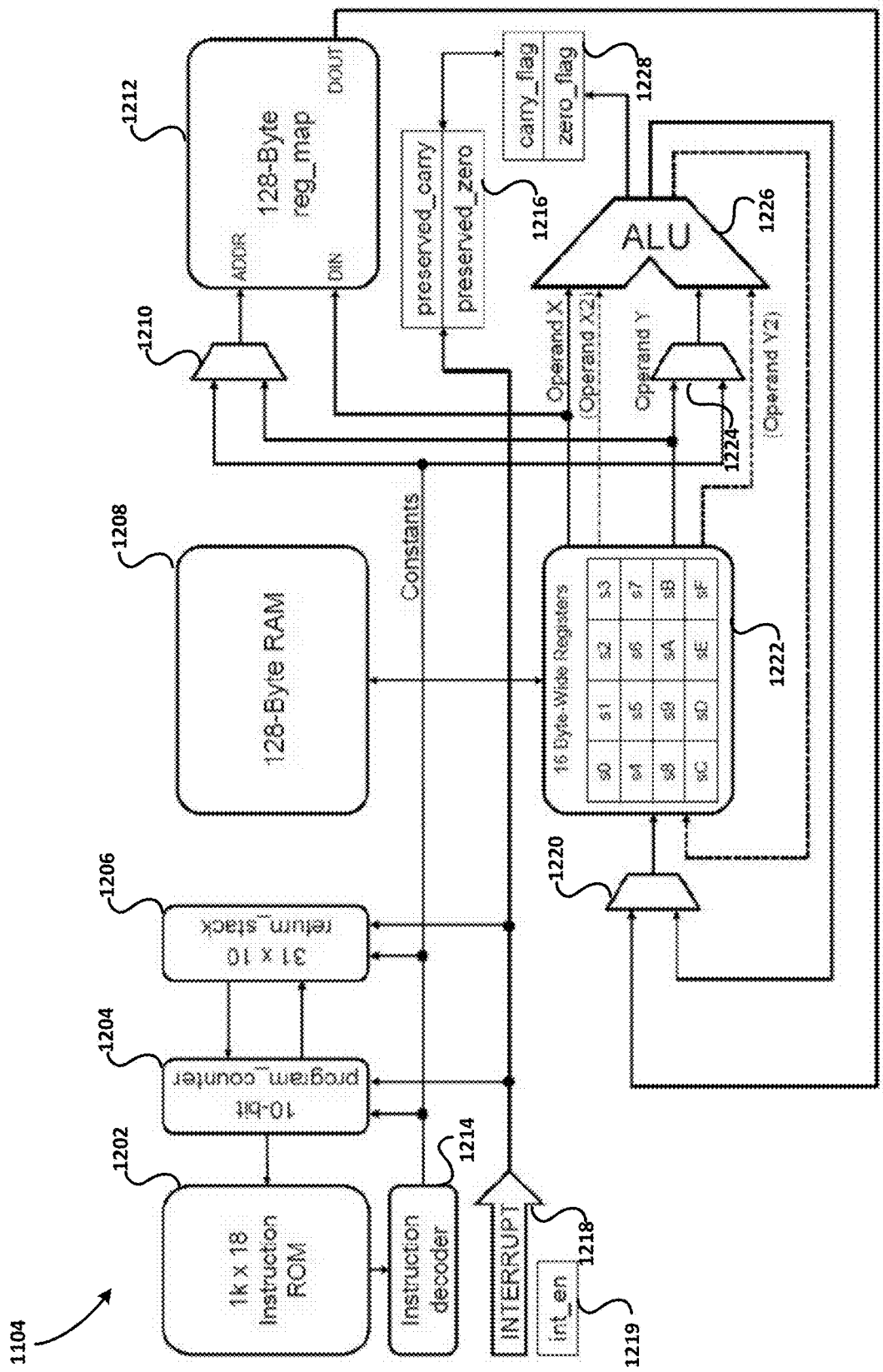
FIG. 12 is a block diagram of a Reduced Instruction Set Computer (RISC) architecture as known in the art, which can be used in the synchronous module of the processing system of FIG. 11.

The picoProcessor used for the synchronous module 1104 is shown in the block diagram of FIG. 12. Synchronous module 1104 comprises a compact 8-bit RISC microprocessor core, which is very small and particularly suitable to be transformed into an asynchronous version, according to an embodiment. The picoProcessor of synchronous module 1104 implements 16 byte-wide general purpose internal registers 1222, instruction ROM 1202, return_stack 1206, RAM 1208, reg_map 1212, and ALU 1226. As shown, 16 byte-wide general purpose internal registers 1222 includes registers so through sF. All registers so through sF are equivalent, as there are no registers reserved for special instructions. The only exception is represented by the (few) wide instructions, which operate on couples of registers of the form {sX, sX+1}, where X is even. Internal registers 1222 are coupled to multiplexers 1210, 1220, and 1224. Instruction ROM 1202 capable of storing 1024 18-bit instructions is coupled to a 10-bit program counter 1204, which points to the next instruction to be executed, and instruction decoder 1214. In some embodiments, most of the instructions result in a simple increment of this program counter 1204. Some exceptions to this may include branch instructions (CALL, RETURN, JUMP, RETURNI) and an interrupt. In some embodiments, program counter 1204 is not directly readable by the code, but may be written to an immediate value through the JUMP instruction.

A return stack 1206 coupled to program counter 1204 is capable of containing up to 31 return addresses. The maximum number of nested subroutines is therefore 30 when interrupts are enabled. The return stack 1206 is managed using a stack index register (not shown) that always points to the first free location at the top of the stack.

Data may be written from one of the 16 general purpose registers to a RAM location of 128 byte RAM 1208 using the OUTPUT instruction. The complementary instruction is called INPUT; together they greatly extend the memory storage available to the processor without using any register in the I/O space. The RAM register address can be specified directly with an immediate constant pp contained inside the instruction, or indirectly as the content of an internal register sY (not shown).

128 Byte I/O registers, used to exchange data with external peripherals or devices, and referred to as reg_map 1212. INPUT and OUTPUT operations allow accessing this memory space in the same way as with the RAM 1208, for example, by allowing both direct and indirect addressing. Some of these registers of reg_map 1212 may read-only for the processor, since they are written by external devices.

An Arithmetic Logic Unit (ALU) 1226 performs calculations such as logical, arithmetic, comparison and shift/rotation operations. Most of the operations require a specified internal register sX as a first operand, and can require a second operand in the form of another internal register sY or an immediate constant "kk". Some instructions operate on 16-bit operands and therefore take as inputs couples of registers of the form {sX, sX+1} and {sY, sY+1}. The result of each operation is stored in the first operand register(s): sX for 1-Byte results and {sX, sX+1} for 2-Byte results.

Many of the ALU operations also modify the zero_flag and the carry_flag 1228. The meaning of the content of these flags is specific to each instruction, although the zero_flag usually indicates if the result of the operation is zero.

An interrupt input 1218 allows a response to external events occurring at any time during the execution flow. The responsivity of the processor to interrupts can be enabled/disabled by acting on the int_en flag 1219. If an interrupt event arises and the processor has int_en set to 1, the program_counter is saved at the top of the return_stack, zero_flag and carry_flag are backed up as preserved_zero and preserved_carry1218 1216, the int_en is reset to prevent nested interrupts and the interrupt vector address (0x3FF) is loaded in the program counter 1204.

Figure 13:
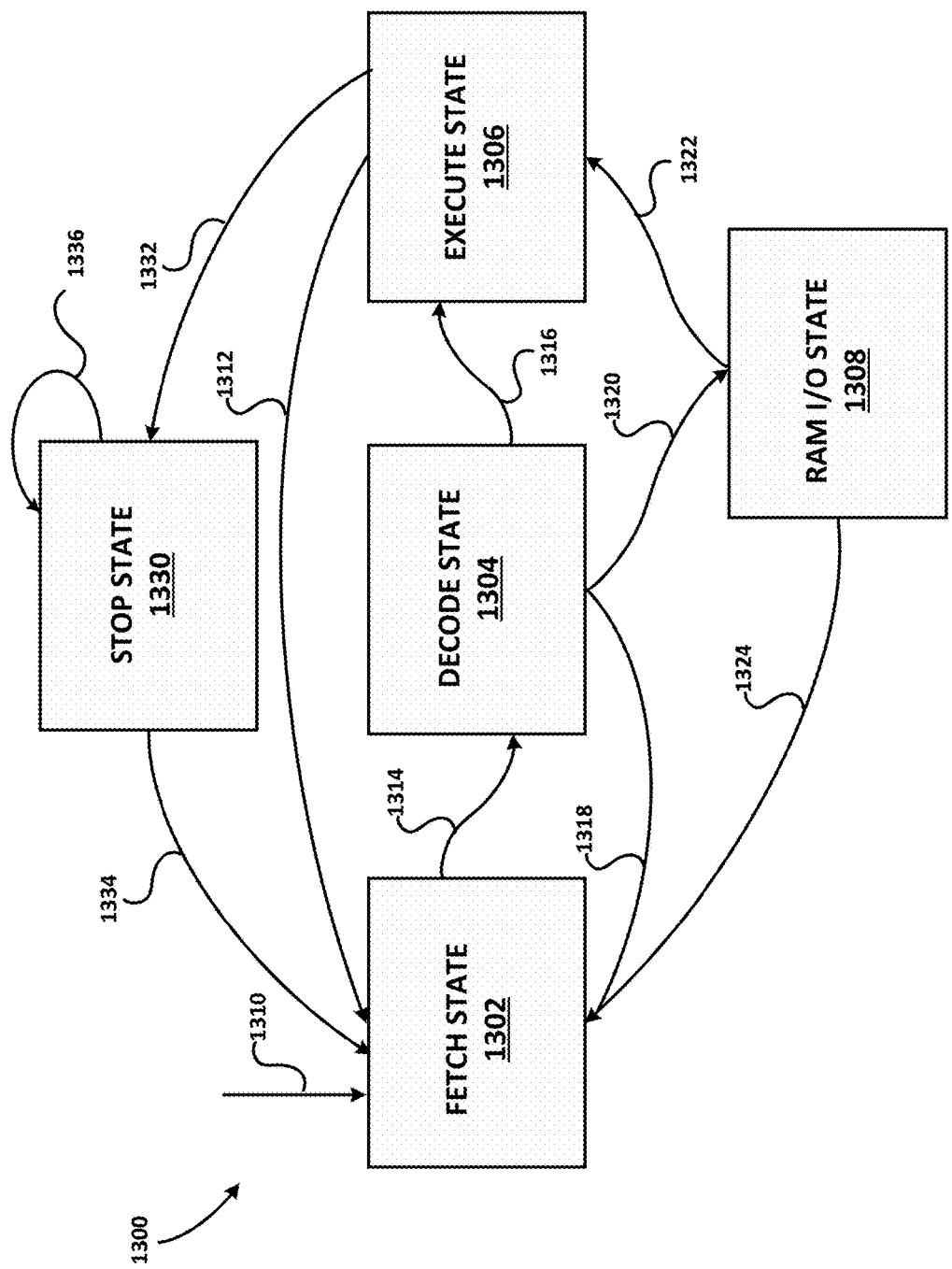
FIG. 13 is a flow chart of the logic and arithmetic instruction flow of the asynchronous module of the processing system of FIG. 11.

The design and operation of the asynchronous module 1102 is described below in further detail with respect to FIGS. 13, 14, and 15. The operation of the picoProcessor of synchronous module 1104 described above is partitioned of into states. A finite state machine with four states can be defined and its state graph is shown in FIG. 13. Each state has a set of inputs, which correspond to the data that must be elaborated in that state, and a set of outputs, representing the results of its operation. In the diagram form of FIG. 13, the finite state machine is a finite set of states represented by blocks called nodes and transitions between the states represented by arcs between the blocks. Each arc begins at one state and ends at another, and contains an arrowhead at the ending state. Thus, FIG. 13 shows the five states including a FETCH state 1302, a DECODE state 1304, an EXECUTE state 1306, a RAM I/O state 1308, and a STOP state 1330; transition arcs 1312, 1314, 1316, 1318, 1320, 1322, 1324, 1332, and 1334; and RESET instruction 1310.

The first state, active after the RESET instruction 1310, is the FETCH state 1302. The FETCH state is simple, as it takes the program_counter, accesses the PROM location pointed by it and updates its output containing the next instruction to be executed. It then always activates the DECODE state 1304.

The DECODE state 1304 takes as an input the new instruction fetched by the FETCH state 1302, and performs different operations leading to different states depending on the type of instruction:

If the instruction is logical, arithmetic, load, or requires I/O interaction with the reg_map, the DECODE state 1304 accesses the proper internal registers and prepares them as the operands inputs to the EXECUTE state. The machine then passes to the EXECUTE state.

If the instruction is a branch of any kind, the DECODE state 1304 updates the program_counter and the return_stack, and activates the FETCH state 1302.

If the instruction is an output to RAM, the DECODE state 1304 accesses the proper internal registers and updates the "datain" and address signals of the RAM interface. It sets the ram_io flag to a logic 1 to indicate that the operation to be performed is an output. The next state is then the RAM I/O state 1308.

If the instruction is an input from RAM, the DECODE state 1304 accesses the proper internal registers and updates the address signal of the RAM interface. It also updates the value of the operandY, later needed by the EXECUTE state 1306 to store the data read from RAM, and sets the ram_io flag to a logic o. The next state is then the RAM I/O state 1308.

The EXECUTE state 1306 contains the ALU and is therefore responsible for the computation of operations that result in an update of the internal registers and of carry_flag and zero_flag. It also manages the restore of carry_flag and zero_flag during a RETURNI instruction, and any I/O operation involving the reg_map. The next state is always the FETCH state 1302 in all cases except when the execution is ended (stop instruction). In this case the next state is STOP state 1330.

The RAM I/O state 1308 has a different behavior depending on the type of access to the RAM that it has to perform. If the instruction is an output to RAM (indicated by ram_io=1), the state generates the clock and write enable signals for the RAM with a proper timing to assure that the "datain" and address signals prepared by the DECODE state are correctly sampled by the RAM. It then switches to the FETCH state 1302. If, on the other hand, the instruction to be executed is an input from RAM (ram_io=0), the RAM I/O state generates the clock signal for the RAM with a proper timing to assure that the address signal prepared by the DECODE state is correctly sampled by the RAM. It then switches to the EXECUTE state to save the data read from the RAM into the internal registers.

The STOP state 1330 transitions from the EXECUTE state 1306 through transition arc 1332 and to the FETCH state 1302 through INTERRUPT arc 1334. The STOP state 1330 can also return to the stop state through transition arc 1336. The STOP state 1330 is used to freeze the execution of the processor when the current execution is ended. Transition arc 1336 is a representation that once the STOP state 1330 is entered, the processor execution is halted until a new execution is requested by the product through an interrupt request. The interrupt request coming from the product is represented by INTERRUPT arc 1334 and determines the transition from the STOP state 1330 to the FETCH state 1302.

In a mode of operation, processing system 1100 begins in the FETCH state 1302, transitions through transition arc 1314, enters the DECODE state 1304, transitions through transition arc 1316, enters the EXECUTE state 1306, transitions through transition arc 1332 to a STOP state 1330. In an embodiment processing system 1100 can transition through INTERRUPT arc 1334 back to the FETCH state 1302. The sequence and timing of the states can vary during the execution, and can be tailored to each different instruction being executed.

Figure 14:
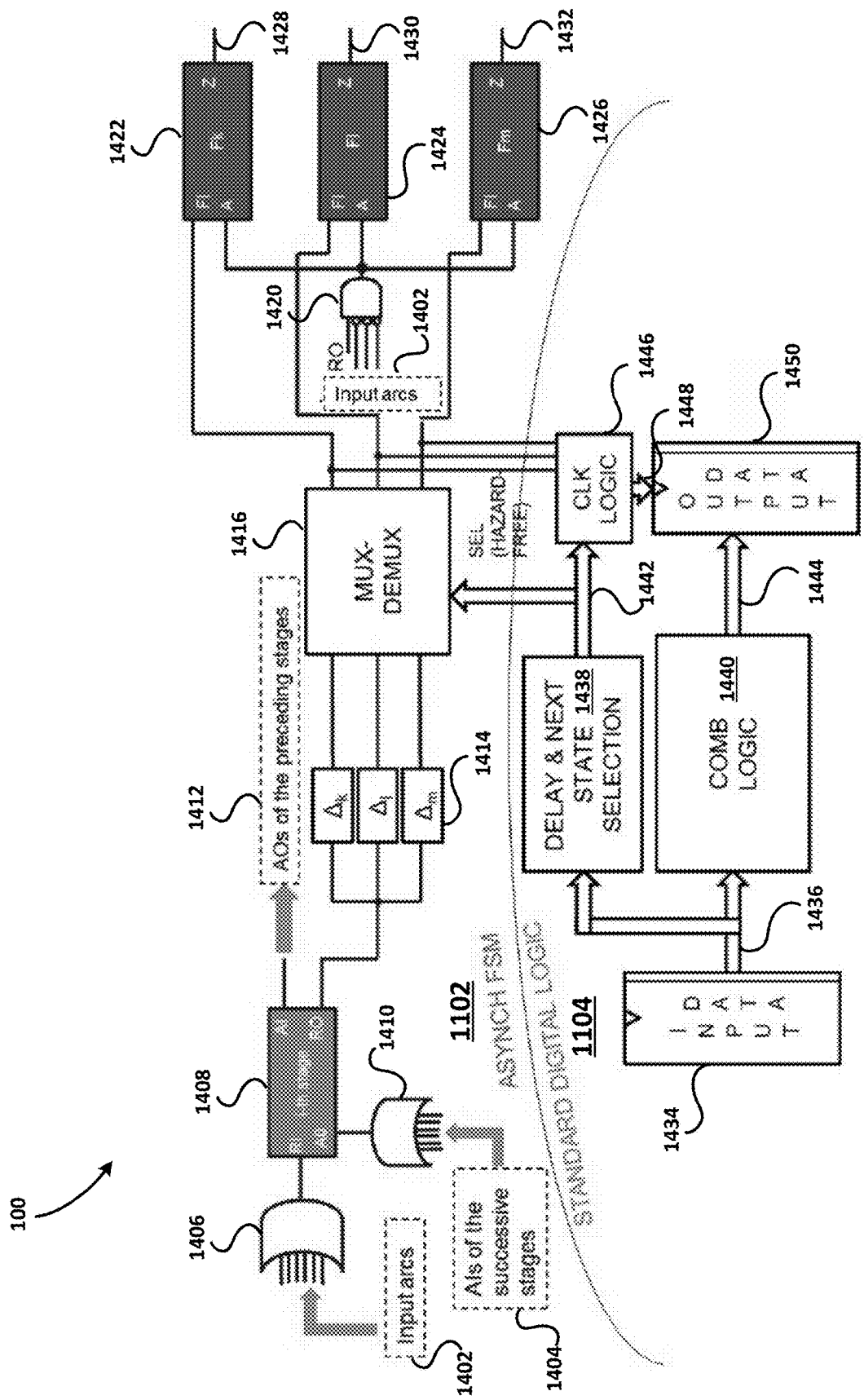
FIG. 14 a detailed block diagram of the processing system shown in FIG. 11.

An implementation of the processing system (which can also be referred to as an asynchronous microprocessor) 1100 including asynchronous module 1102 and synchronous module 1104 is shown in FIG. 14, wherein the following inputs and outputs are described below.

The input arcs 1402 to OR gate 1406 are the request signals coming from arc cells of preceding states of the Asynchronous Finite State Machine (AFSM); the AIs of the successive stages 1404 to OR gate 1410 are the acknowledge signals coming from state cells of successive states of the AFSM; and the AOs of the preceding stages 1412 are the acknowledge signals going to the state cells of preceding states of the AFSM. The input arcs 1402 are also received by AND gate 1420. The outputs 1428, 1430, and 1432 of output arc cells 1422, 1424, and 1426 are the request signals going to the state cells 1408 of successive states of the AFSM.

Each of the blocks shown in FIG. 14 are defined below, wherein, in the asynchronous finite state machine of the asynchronous module 1102 the i-th stage state cell 1408 represents the state cell of the state under consideration. Its circuit implementation was previously shown and described with respect to FIG. 9. The symbols $\Delta_k$, $\Delta_l$, $\Delta_m$ represent the digital delays 1414 (parallel delay stages) used to generate the local clock signals. They are implemented as simple digital buffers, in an embodiment, to introduce a precise delay. The Mux/Demux circuit 1416 is the series connection of a multiplexer and a demultiplexer, having a control input driven by clock selector bus 1442, which is designed to be hazard-free in an embodiment. In an embodiment, it must be assured that the signals in the clock selector bus 1442 are stable and free of glitches before any of the outputs of the digital delays 1414 rises, otherwise spurious impulses can be triggered in the clock logic block 1446 and output arc cells 1422, 1424, and 1426, possibly leading to a faulty behavior of the system.

The $F_k$, $F_l$, $F_m$ labels refer to the output arc cells 1422, 1424, and 1426 of the arcs going out from the state under consideration. Their circuit implementation was previously shown and described with respect to FIG. 10.

Each of the blocks shown in FIG. 14 are defined below, wherein, in the standard digital logic of the synchronous module 1104 the input data registers 1434 are the registers containing the data to be elaborated by the combinatorial logic of the state under consideration; the combinatorial logic block 1440 is the combinatorial logic responsible for the elaboration of the input data; the output data registers 1450 are the registers responsible for the storage of the results of data elaboration; the delay and next state selection block 1438 is the combinatorial logic used to determine the proper clock delay, future state and clocking strategy, based on the information contained in the input data; and the clock logic block 1446 is the combinatorial logic used to implement the proper clocking strategy to save the results of the data elaboration in the output registers. The combinatorial logic block 1440 comprises a parallel path to the delay and next state selection block 1438.

The elaboration stages of the processor (DECODE, EXECUTE, FETCH, I/O, AND STOP) are physically mapped to the states of the asynchronous FSM.

In FIG. 14, the subdivision demarcation line between the synchronous module 1104 at the bottom of the figure, implemented with standard design flows, and the asynchronous finite state machine of the asynchronous module 1102 at the top of the figure, is shown in the middle of the figure.

In the lower half of FIG. 14, the synchronous part of one state is schematized: firstly, there is a set of input data registers 1434 containing the input data to be processed. A combinatorial logic block 1440 performs the data elaboration and its outputs are saved in a set of output data registers 1450. In parallel to the combinatorial logic for data elaboration, another combinatorial block named "Delay and next state selection" 1438 is used to select the appropriate delay to match the propagation delay of the current state, and to decide the next state of elaboration. A clock logic block 1446 is then responsible for the generation of the clock signals for the output data registers 1450, based on the control signals coming from the asynchronous finite state machine.

In the top half of FIG. 14, the logic of one state of the asynchronous finite state machine is represented. Each time the AFSM is in a certain state, the corresponding state cell 1408 is activated. The signals going into and out of the state cell 1408 implement the handshake protocol needed for the various states of the AFSM to interact properly with each other. In particular, the signal RO indicates that the current state is active. This signal is an input to multiple different delay lines (indicated in FIG. 14 with $\Delta_k$, $\Delta_l$, $\Delta_m$), one for every possible elaboration made by the combinatorial logic. By using the "Mux-Demux" circuit 1416, the "Delay and next state selection" block 1438 can select only one of the delay lines to be used, depending on the propagation delay of the combinatorial logic. This delayed version of the signal RO is used to clock the output data registers 1450 and also to send the activation request to one of the possible future states of the AFSM. This last function is realized by the output arc cells 1422, 1424, and 1426, each of them corresponding to one arc connecting two states of the finite state machine.

Figure 15:
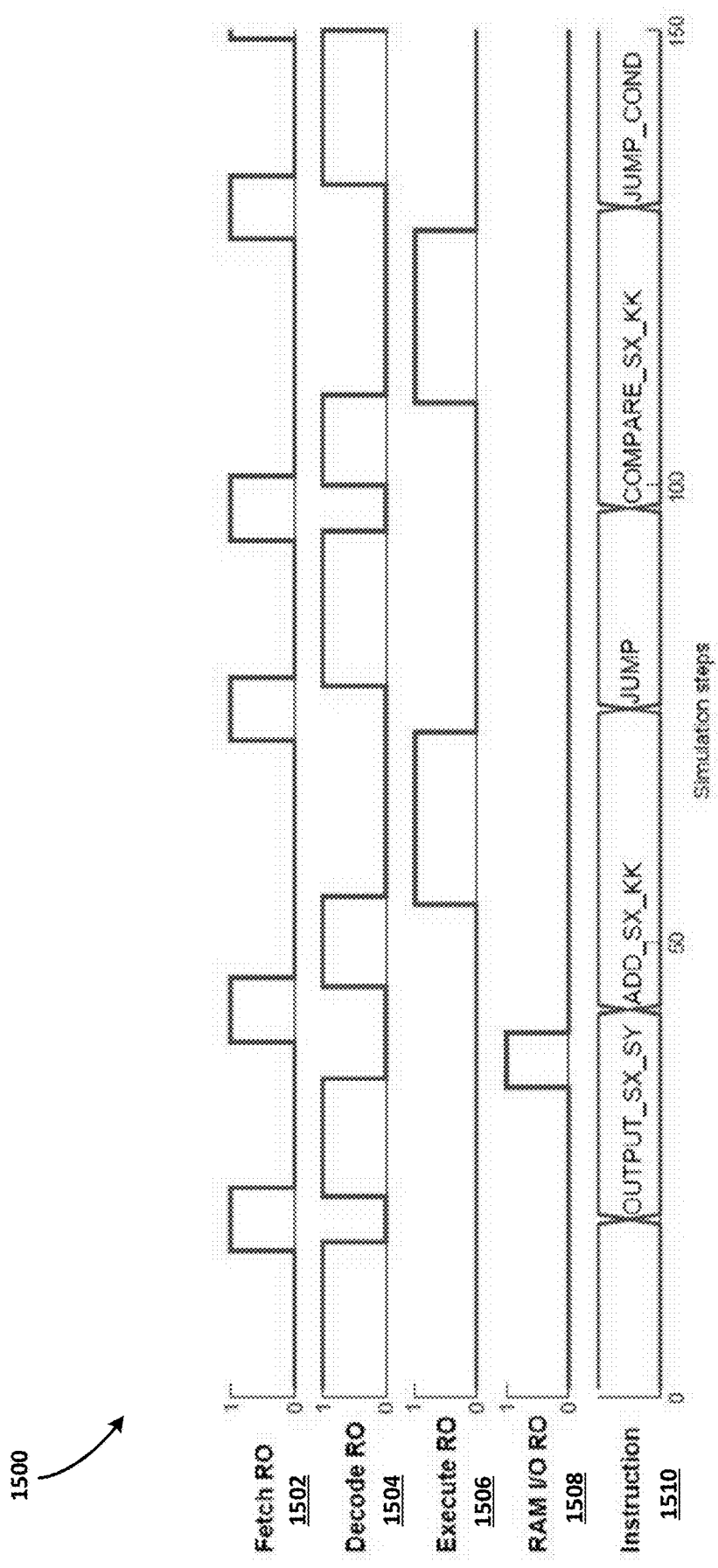
FIG. 15 is a timing diagram for the processing system shown in FIG. 11.

To clarify the operation of the AFSM inside the asynchronous processor, FIG. 15 is an extract from a behavioral simulation of the asynchronous processor reporting the RO signals of the four states and the content of the instruction register. These waveforms represent only one interval of execution of a complex program.

FIG. 15 is thus a timing diagram of waveforms of the RO signals and the content of the instruction register, from a behavioral simulation. The waveforms of pulses of the RO signals represent the sequence and timing of states followed by the processor during the execution: the first pulse of the FETCH RO signal 1502 corresponds, for example, to the fetching of instruction OUTPUT SX SY, which is then decoded and produces at the end a pulse in the RAM I/O state. The following instruction is an ADD, and therefore its relative sequence of states is: FETCH, DECODE, and EXECUTE. The same principle is valid for all successive instructions. The DECODE TO signal 1504, the EXECUTE RO signal 1506, the RAM I/O RO signal, and the INSTRUCTION signal 1510 are also shown in FIG. 15.

The duration of each RO pulse depends on the entity of the matching delay that is selected in the execution of the relative state. For example, it can be noted that the duration of the RO pulses of the DECODE state changes from cycle to cycle, depending on the complexity of the instruction being decoded.

The architecture of the processing system described herein can be used to implement a generic digital system for data elaboration and is not restricted to the application of a microprocessor. In comparison synchronous processing system, the use of different selectable delays to match the latency of the combinatorial logic advantageously allows obtaining better timing performances than the use of a worst-case estimate. Whereas a synchronous architecture often accounts for the maximum propagation delay of the data-elaboration logic, the embodiment architecture can use an actual-case estimate.

The embodiment architecture includes other improvements regarding current consumption. For example, in a synchronous digital system most of the current is demanded to the power supply near the edge of the main clock. In the asynchronous architecture described herein, the clock tree is partitioned into local clock domains, at least one for every state of the AFSM. Each clock tree is activated at a different time instant, which allows obtaining time spreading of the current consumption peaks.

A further advantage of the asynchronous architecture when compared to other asynchronous implementations of digital systems, is the possibility to have a fully custom flow of execution, e.g., a state machine in which the stages can activate in various sequences, depending on the operation being executed.

It is a further advantage of the asynchronous circuit proposed for the finite state machine of the asynchronous controller that it is also fully testable for stuck-at faults with a custom test flow.

Example 1. According to an embodiment, a processor includes a synchronous circuit including a plurality of processing stages, wherein each processing stage includes a selection data bus; and an asynchronous circuit coupled to each selection data bus, wherein the asynchronous circuit includes an asynchronous state machine whose states correspond to a process phase or a plurality of circuits, wherein the asynchronous circuit further includes a selectable delay circuit whose delay is determined by a present state of the asynchronous state machine, and wherein the asynchronous circuit is configured for generating a plurality of processing stage clock signals each having a selectable delay provided by the selectable delay circuit.

Example 2. The processor of Example 1, wherein the synchronous circuit includes a decode processing stage, an execute processing stage, and an input/output (I/O) processing stage.

Example 3. The processor of any of the above examples, wherein the asynchronous circuit includes a fetch clock circuit, a decode clock circuit, an execute clock circuit, and an I/O clock circuit for generating a plurality of processing stage clock signals.

Example 4. The processor of any of the above examples, wherein the fetch clock circuit includes a fetch delay circuit for generating a fetch clock signal.

Example 5. The processor of any of the above examples, wherein the decode clock circuit includes a decode delay circuit and a multiplexer/demultiplexer coupled to a decode selection data bus for generating a plurality of decode clock signals.

Example 6. The processor of any of the above examples, wherein the execute clock circuit includes an execute delay circuit and a multiplexer/demultiplexer coupled to an execute selection data bus for generating a plurality of execute clock signals.

Example 7. The processor of any of the above examples, wherein the I/O clock circuit includes an I/O delay circuit and a multiplexer/demultiplexer coupled to an I/O selection data bus for generating a plurality of I/O clock signals.

Example 8. The processor of any of the above examples, wherein the asynchronous circuit includes a stop circuit for receiving an interrupt signal.

Example 9. According to an embodiment, a method of operating a processor including a synchronous circuit including a plurality of processing stages and an asynchronous circuit including a plurality of clock circuits including generating selection data in the plurality of processing stages, which is received by the plurality of clock circuits; and generating a plurality of clock signals in the plurality of clock circuits, which is received by the plurality of processing stages, and wherein each of the plurality of clock signals include a delay determined by a present state of the asynchronous circuit.

Example 10. The method of Example 9, further including determining a present state of the synchronous circuit; selecting a delay circuit in the asynchronous circuit based on the determined present state of the synchronous circuit; clocking portions of the synchronous circuit using the selected delay circuit; processing input data into processed output data; and entering a future state of the synchronous circuit using the processed output data and the present state of the synchronous circuit.

Example 11. The method of any of the above examples, wherein the synchronous circuit includes a decode processing stage, an execute processing stage, and an input/output (I/O) processing stage.

Example 12. The method of any of the above examples, wherein the asynchronous circuit includes a decode clock circuit, an execute clock circuit, and an I/O clock circuit for generating the plurality of clock signals.

Example 13. The method of any of the above examples, wherein each of the plurality of clock signals includes a different local clock domain.

Example 14. According to an embodiment, a processor includes a synchronous circuit including an input data register, a delay and next state selection circuit coupled to the input data register, a clock logic circuit coupled to the delay and next state selection circuit, and an output data register coupled to the clock logic circuit, wherein the delay and next state selection circuit is configured for generating selection data on a selection data bus, and wherein the clock logic circuit is configured for receiving a plurality of clock signals; and an asynchronous circuit coupled to the selection data bus, wherein the asynchronous circuit is configured for receiving the selection data and in response generating the plurality of clock signals, and wherein each of the clock signals correspond to propagation delays of the delay and next state selection circuit.

Example 15. The processor of Example 14, wherein each of the plurality of clock signals includes a different local clock domain.

Example 16. The processor of any of the above examples, wherein the synchronous circuit further includes a parallel path between the input data register and the output data register, wherein the parallel path includes a combinatorial logic circuit.

Example 17. The processor of any of the above examples, wherein the asynchronous circuit includes a plurality of parallel delay stages coupled to a multiplexer/demultiplexer, wherein the multiplexer/demultiplexer is configured for receiving the selection data, and wherein the multiplexer/demultiplexer is configured for generating the plurality of clock signals.

Example 18. The processor of any of the above examples, further including a plurality of state cells coupled to the plurality of parallel delay stages.

Example 19. The processor of any of the above examples, further including a plurality of arc cells coupled to the multiplexer/demultiplexer.

Example 20. The processor of any of the above examples, wherein the synchronous circuit includes a Reduced Instruction Set Computer (RISC) processor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processor comprising:
a synchronous circuit comprising a plurality of processing stages, wherein each processing stage comprises a selection data bus; and
an asynchronous circuit coupled to each selection data bus, wherein the asynchronous circuit comprises an asynchronous state machine whose states correspond to a process phase or a plurality of circuits, wherein the asynchronous circuit further comprises a selectable delay circuit whose delay is determined by a present state of the asynchronous state machine, wherein the asynchronous circuit is configured for generating a plurality of processing stage clock signals each having a selectable delay provided by the selectable delay circuit, and wherein the selectable delay comprises a delay matched to a latency of each corresponding different specific instruction in the synchronous circuit.

2. The processor of claim 1, wherein the synchronous circuit comprises a decode processing stage, an execute processing stage, and an input/output (I/O) processing stage.

3. The processor of claim 1, wherein the asynchronous circuit comprises a fetch clock circuit, a decode clock circuit, an execute clock circuit, and an I/O clock circuit for generating a plurality of processing stage clock signals.

4. The processor of claim 3, wherein the fetch clock circuit comprises a fetch delay circuit for generating a fetch clock signal.

5. The processor of claim 3, wherein the decode clock circuit comprises a decode delay circuit and a multiplexer/demultiplexer coupled to a decode selection data bus for generating a plurality of decode clock signals.

6. The processor of claim 3, wherein the execute clock circuit comprises an execute delay circuit and a multiplexer/demultiplexer coupled to an execute selection data bus for generating a plurality of execute clock signals.

7. The processor of claim 3, wherein the I/O clock circuit comprises an I/O delay circuit and a multiplexer/demultiplexer coupled to an I/O selection data bus for generating a plurality of I/O clock signals.

8. The processor of claim 1, wherein the asynchronous circuit comprises a stop circuit for receiving an interrupt signal.

9. A method of operating a processor comprising a synchronous circuit including a plurality of processing stages and an asynchronous circuit including a plurality of clock circuits, the method comprising:
generating selection data in the plurality of processing stages, which is received by the plurality of clock circuits; and
generating a plurality of clock signals in the plurality of clock circuits, which is received by the plurality of processing stages, wherein each of the plurality of clock signals comprise a delay determined by a present state of the asynchronous circuit, and wherein the delay is matched to a latency of each corresponding different specific instruction in the synchronous circuit.

10. The method of claim 9, further comprising:
determining a present state of the synchronous circuit;
selecting a delay circuit in the asynchronous circuit based on the determined present state of the synchronous circuit;
clocking portions of the synchronous circuit using the selected delay circuit;
processing input data into processed output data; and
entering a future state of the synchronous circuit using the processed output data and the present state of the synchronous circuit.

11. The method of claim 9, wherein the synchronous circuit comprises a decode processing stage, an execute processing stage, and an input/output (I/O) processing stage.

12. The method of claim 9, wherein the asynchronous circuit comprises a decode clock circuit, an execute clock circuit, and an I/O clock circuit for generating the plurality of clock signals.

13. The method of claim 9, wherein each of the plurality of clock signals comprises a different local clock domain.

14. A processor comprising:
a synchronous circuit comprising an input data register, a delay and next state selection circuit coupled to the input data register, a clock logic circuit coupled to the delay and next state selection circuit, and an output data register coupled to the clock logic circuit, wherein the delay and next state selection circuit is configured for generating selection data on a selection data bus, and wherein the clock logic circuit is configured for receiving a plurality of clock signals; and
an asynchronous circuit coupled to the selection data bus, wherein the asynchronous circuit is configured for receiving the selection data and in response generating the plurality of clock signals, wherein each of the clock signals correspond to propagation delays of the delay and next state selection circuit, wherein the asynchronous circuit comprises a plurality of parallel delay stages coupled to a multiplexer/demultiplexer, wherein the multiplexer/demultiplexer is configured for receiving the selection data, and wherein the multiplexer/demultiplexer is configured for generating the plurality of clock signals in parallel.

15. The processor of claim 14, wherein each of the plurality of clock signals comprises a different local clock domain.

16. The processor of claim 14, wherein the synchronous circuit further comprises a parallel path between the input data register and the output data register, wherein the parallel path comprises a combinatorial logic circuit.

17. The processor of claim 14, further comprising a plurality of state cells coupled to the plurality of parallel delay stages.

18. The processor of claim 14, further comprising a plurality of arc cells coupled to the multiplexer/demultiplexer.

19. The processor of claim 14, wherein the synchronous circuit comprises a Reduced Instruction Set Computer (RISC) processor.

20. The processor of claim 14, wherein the synchronous circuit comprises a picoProcessor.

* * * * *